United States Patent
Calinog et al.

(10) Patent No.: US 11,636,475 B1
(45) Date of Patent: Apr. 25, 2023

(54) PREDICTING AND MAKING PAYMENTS VIA PREFERRED PAYMENT METHODS

(71) Applicant: Wells Fargo Bank, N.A., San Francisco, CA (US)

(72) Inventors: Millicent Calinog, Park City, UT (US); Patricia Chouanard-McAdam, Maple Grove, MN (US); Chris Kalaboukis, San Jose, CA (US); Kristine Ing Kushner, Orinda, CA (US); Muhammad Farukh Munir, Pittsburg, CA (US); Raissa Williams, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 511 days.

(21) Appl. No.: 16/148,555

(22) Filed: Oct. 1, 2018

(51) Int. Cl.
*G06Q 30/00* (2012.01)
*G06Q 20/40* (2012.01)
*G06Q 20/10* (2012.01)
*G06Q 20/36* (2012.01)
*G06Q 30/0601* (2023.01)

(52) U.S. Cl.
CPC ........... *G06Q 20/40* (2013.01); *G06Q 20/102* (2013.01); *G06Q 20/3678* (2013.01); *G06Q 30/0633* (2013.01)

(58) Field of Classification Search
CPC .. G06Q 20/102; G06Q 20/3678; G06Q 20/40; G06Q 30/0633
See application file for complete search history.

(56) References Cited

U.S. PATENT DOCUMENTS

| | | | |
|---|---|---|---|
| 7,930,249 B2 | 4/2011 | Roberts | |
| 8,788,324 B1 | 7/2014 | Shetty et al. | |
| 8,788,421 B2 * | 7/2014 | DuCharme | G06Q 20/3821 705/44 |
| 9,390,430 B2 | 7/2016 | Unser et al. | |

(Continued)

OTHER PUBLICATIONS

"Taxonomy of Payments: a repertory grid analysis," by Jonas Hedman, Felix B. Tan, Jacques Holst, and Martin Kjeldsen, International Journal of Bank Marketing, vol. 35, No. 1, (2017), pp. 75-96 (Year: 2017).*

(Continued)

*Primary Examiner* — Anne M Georgalas
(74) *Attorney, Agent, or Firm* — Foley & Lardner LLP

(57) ABSTRACT

Systems and methods for predicting and making payments via preferred payment methods include determining an amount that a payer owes a payee, predicting a preferred funds transfer method of the payee, providing a notification to a payee device associated with the payee, receiving a user input from the payee device indicating an agreement with the preferred funds transfer method, and initiating, in response to the user input, a funds transfer from a source account of the payer to the payee. Predicting a preferred funds transfer method of the payee can include performing data analytics on at least one data source associated with the payee, such as a smart digital wallet, a social network account, a smart appliance, a financial account, a financial transaction, a shopping list, and a geographic location, etc. In some embodiments, predicting a preferred funds transfer method of the payee includes rerouting the payment to downstream payees.

29 Claims, 5 Drawing Sheets

(56) References Cited

U.S. PATENT DOCUMENTS

| | | | |
|---|---|---|---|
| 9,679,284 B2 | 6/2017 | Andrews et al. | |
| 9,704,149 B2 | 7/2017 | Granbery et al. | |
| 9,704,195 B2 | 7/2017 | Zoldi | |
| 9,805,369 B2* | 10/2017 | Thomas | G06Q 20/383 |
| 10,692,085 B2* | 6/2020 | Zagarese | G06Q 20/40145 |
| 10,956,894 B2* | 3/2021 | O'Toole | G06Q 20/326 |
| 10,963,868 B1* | 3/2021 | McCauley | G06Q 20/401 |
| 2002/0111886 A1* | 8/2002 | Chenevich | G06Q 20/02 |
| | | | 705/30 |
| 2004/0143552 A1* | 7/2004 | Weichert | G06Q 40/04 |
| | | | 705/64 |
| 2008/0006685 A1* | 1/2008 | Rackley, III | G06Q 40/00 |
| | | | 235/379 |
| 2009/0018923 A1 | 1/2009 | Chen et al. | |
| 2009/0171724 A1* | 7/2009 | Allin | G06Q 10/06 |
| | | | 705/30 |
| 2011/0320345 A1 | 12/2011 | Taveau et al. | |
| 2012/0158583 A1* | 6/2012 | Evers | G06Q 20/102 |
| | | | 705/40 |
| 2012/0239417 A1 | 9/2012 | Pourfallah et al. | |
| 2013/0054461 A1* | 2/2013 | Gupta | G06Q 20/0425 |
| | | | 705/44 |
| 2013/0204728 A1 | 8/2013 | Lighterman et al. | |
| 2014/0067677 A1* | 3/2014 | Ali | G06Q 20/02 |
| | | | 705/44 |
| 2014/0129357 A1 | 5/2014 | Goodwin | |
| 2014/0136400 A1 | 5/2014 | Espey et al. | |
| 2014/0172694 A1* | 6/2014 | Kanjlia | G06Q 20/386 |
| | | | 705/39 |
| 2014/0222597 A1 | 8/2014 | Nadella et al. | |
| 2014/0279466 A1* | 9/2014 | Capps | G06Q 20/202 |
| | | | 705/40 |
| 2014/0337235 A1* | 11/2014 | Van Heerden | G06Q 20/383 |
| | | | 705/71 |
| 2016/0012452 A1 | 1/2016 | Unser et al. | |
| 2016/0098708 A1* | 4/2016 | Loomis | G06Q 20/367 |
| | | | 705/39 |
| 2017/0169419 A1 | 6/2017 | Huang | |
| 2017/0255985 A1* | 9/2017 | Acott | G06Q 30/0633 |
| 2017/0308952 A1 | 10/2017 | Zoldi | |
| 2017/0357954 A1* | 12/2017 | Tribble | G06Q 20/401 |
| 2018/0018666 A1* | 1/2018 | Solanki | G06Q 20/3276 |
| 2018/0068293 A1* | 3/2018 | Dunne | G06Q 20/3223 |

OTHER PUBLICATIONS

"Analysis of Security Issues in Electronic Payment Systems," by Princewill Aigbe and Jackson Apkojaro, International Journal of Computer Applications (0975-8887), vol. 108, No. 10, Dec. 2014 (Year: 2014).*

Alipay service agreement; https://translate.google.com/translate?hl=en&sl=zh-CN&u=https://help.alipay.com/lab/searchList.htm%3Fkeyword%3D%25D6%25A7%25B8%25B6%25C5%25C5%25D0%25F2&prev=search Google Translation of Chinese Document. 11 pages.

* cited by examiner

PREDICTING AND MAKING PAYMENTS VIA PREFERRED PAYMENT METHODS

BACKGROUND

Business organizations frequently hire contractors who, in turn, hire subcontractors. Even if a contractor experiences a cash flow problem, the contractor will still need to pay its subcontractor on time. Additionally, a contractor (payee) of a business organization may have evolving business needs and expenses that may require changes in the preferred payment methods used by the contractor. More generally, when a business owes an individual a payment, such as a refund, individuals may find default payment methods, such as receiving a paper check, inconvenient and inefficient.

SUMMARY

An example embodiment relates to a computer-implemented method performed by one or more processors of a computing system. The method includes determining an amount of funds that a payer owes a payee. The method further includes predicting a preferred funds transfer method of the payee. The method further includes providing a notification to a payee device associated with the payee, the notification comprising the preferred funds transfer method. The method further includes receiving a user input from the payee device indicating an agreement with the preferred funds transfer method. The method further includes initiating an electronic funds transfer, in response to the user input, from a source account of the payer to the payee.

Another example embodiment refers to a computing system comprising at least one processor. The at least one processor is structured to determine an amount of funds that a payer owes a payee. The at least one processor is further structured to predict a preferred funds transfer method of the payee. The at least one processor is further structured to provide a notification to a payee device associated with the payee, the notification comprising the preferred funds transfer method. The at least one processor is further structured to receive a user input from the payee device indicating an agreement with the preferred funds transfer method. The at least one processor is further structured to initiate an electronic funds transfer, in response to the user input, from a source account of the payer to the payee.

Another example embodiment refers to a non-transitory computer readable medium comprising instructions that, when executed, cause at least one processor of a computing system to perform operations. The operations include determining an amount of funds that a payer owes a payee. The operations further include predicting a preferred funds transfer method of the payee. The operations further include providing a notification to a payee device associated with the payee, the notification comprising the preferred funds transfer method. The operations further include receiving a user input from the payee device indicating an agreement with the preferred funds transfer method. The operations further include initiating an electronic funds transfer, in response to the user input, from a source account of the payer to the payee.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
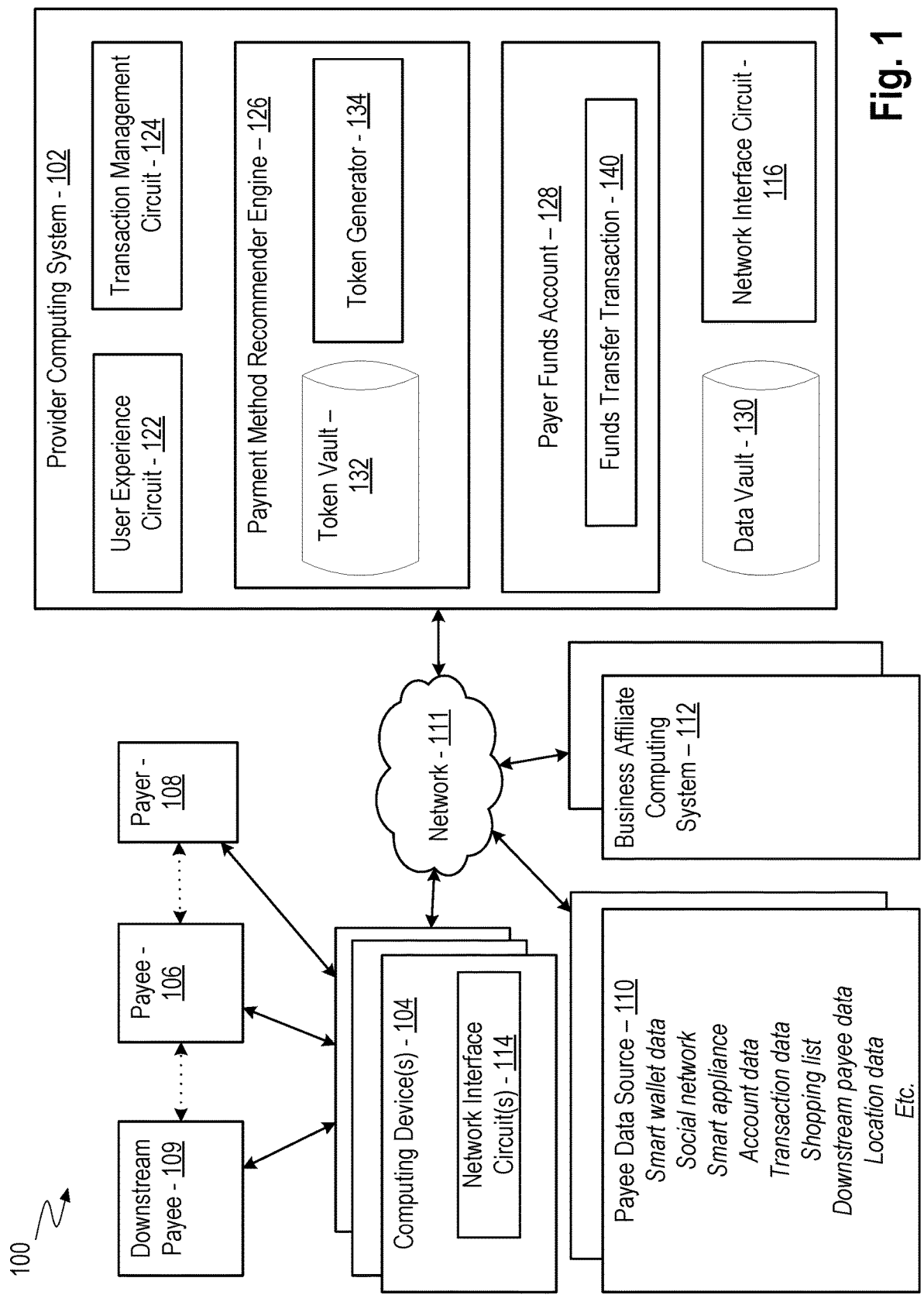
FIG. 1 is a block diagram of a system for predicting and making payments via preferred payment methods, according to an example embodiment.

Referring generally to the figures, systems and methods for predicting and making payments via preferred payment methods are shown.

A business may need to make a payment to an individual. For example, the individual may have performed a service for the business, and the payment may be compensation for the service. As another example, the business may owe the individual a refund. As will be appreciated, systems and methods for predicting and making payments via preferred payment methods include determining an amount of funds that a payer owes a payee, predicting a preferred funds transfer method of the payee, providing a notification to a payee device associated with the payee, receiving a user input from the payee device indicating an agreement with the preferred funds transfer method, and initiating, in response to the user input, a funds transfer from a source account of the payer to the payee. Predicting a preferred funds transfer method of the payee can include performing data analytics on at least one data source associated with the payee, such as a smart digital wallet, a social network account, a smart appliance, a financial account, a financial transaction, a shopping list, and a geographic location, etc. In some embodiments, predicting a preferred funds transfer method of the payee includes identifying candidates for downstream payees and/or providing a user interface for rerouting the payment in whole or in part to a downstream payee.

The embodiments of the business-to-individual payment system described herein improve computer-related technology by performing certain steps that cannot be done by conventional computing systems or human actors. For example, the business-to-individual payment system is configured to analyze, by one or more processors of a provider computing system, data from a data source of the payee if the data is determined to be relevant to determining the preferred payment method of the payee. The data is obtained, scrubbed, and used to programmatically make such a determination, which can be based on a composite/combination of data elements that are conventionally not brought together. For example, a preferred payment method can be determined by analyzing the financial obligations of a user, a current location of the computing device of the user, and/or a travel schedule. As another example, a preferred payment method can be determined by analyzing a shopping list generated based on data provided by a smart appliance of the user and programmatically identifying a relevant retailer that offers the best deal. In an example embodiment, the business-to-individual payment system includes a particular and unique set of rules that are set up to account for and learn from specific transaction patterns, such as a history of transactions between individuals, account usage history, etc.

Furthermore, embodiments described herein solve the technical problem of securely managing cash payments. The problem is solved by programmatically updating electronic tokens and/or vouchers, which can be fully or partially anonymized, and capturing proof-of-custody information when a user designates a user contact/downstream payee to be paid in cash when the voucher/token is monetized. Thus, even individuals that experience cash flow difficulties can pay downstream payees on time. At the same time, proof-of-custody information prevents fraud and multiple attempts to monetize a single token.

Furthermore, embodiments described herein solve the technical problem of determining the appearance and functionality of an electronic user interface. Real-time "push" alerts are provided. The alerts are configured to propose a predicted payment method without requiring the user/payee to enter any target account information to receive the payment. In some embodiments, the proposed payment method can be accepted or changed with a single click. Further still, some embodiments are directed to improved interfaces for managing complex payment arrangements, such as display and notification interfaces for electronic devices with small screens, which may include wearable devices, tablets, mobile phones, and the like. The improved interfaces allow payers and payees to more quickly access desired data and applications through the electronic devices. For example, in some embodiments, a graphical user interface (GUI) is generated and visually presented to the user through a mobile computing device. The GUI conveniently consolidates information on one form and provides an enriched user experience for information drill-down through on-demand expandable forms pre-populated with relevant information, such as a predicted list of ranked payment methods, a predicted downstream payee, a predicted distribution/monetization point for vouchers, etc.

Referring now to FIG. 1, an embodiment of a business-to-individual payment system 100 is depicted. In a brief overview, the business-to-individual payment system 100 includes a provider computing system 102, one or more computing device(s) 104 used by one or more payee(s) 106, one or more payer(s) 108 and/or one or more downstream payee(s) 109, a payee data source 110, and a business affiliate computing system 112.

The payer 108 may be a business that needs to make a payment to an individual, such as the payee 106. For example, payer 108 may owe payee 106 a refund. For instance, payer 108 may be a utility company, a health service provider, a credit card issuer, etc. and may provide overpayment refunds to the payee 106. As another example, payee 106 may have performed a service for the payer 108, and the payment may be compensation for the service. For instance, payee 106 may be an independent contractor (e.g., truck driver, real estate agent, accountant, business consultant, attorney, etc. whose services are engaged by the payer 108), a freelancer (e.g., a writer, graphic designer, software developer, technician, etc.), a temporary worker (e.g., a cleaning person, a landscape designer, etc.), a service provider (e.g., insurance claims processor for a medical office), and/or an on-demand worker (e.g., a driver for Uber™, Lyft™, a childcare provider, a pet care provider, an EAP (employee assistance program) counselor, and the like.) It should be understood that, in some embodiments, the payee 106 is a group of individuals, such as a small business, and/or a legal entity, such as an LLC (limited liability company), LLP (limited liability partnership), and the like.

In some embodiments, payer 108 engages payee 106 on behalf of one or more third parties (not shown). For example, payer 108 may be an employer that offers subsidized child care to its employees, and payee 106 may be a childcare provider. The payee 106 may charge the payer 108 for services rendered to multiple individual employees.

In some embodiments, payee 106 is associated with one or more downstream payee(s) 109 of the payee 106. Payee 106 engages the services of downstream payee 109 for the benefit of the payee 106. According to various embodiments, the downstream payee 109 may be an independent contractor, a freelancer, a temporary worker, a service provider, a supplier, a subcontractor, and/or an on-demand worker. In some embodiments, the business-to-individual payment system 100 is structured to make payments on behalf of the payee 106 directly to the downstream payee(s) 109. For example, as part of predicting the preferred payment method of the payee 106, the business-to-individual payment system 100 may be structured to identify the downstream payee(s) 109 of the payee 106, determine whether the payee 106 owes any funds to the downstream payee(s) 109, and make a payment directly to the downstream payee 109 to satisfy the obligation of the payee 106 to the downstream payee 109. In some embodiments, downstream payee(s) 109 may set further downstream payee(s) such that further downstream payee(s) receive at least part of the portion of the payment due from the payee 106 to the downstream payee 109.

Payee(s) 106, payer(s) 108, and/or downstream payee(s) 109 may hold one or more accounts with one or more entities, such as bank(s), whose computing systems may serve as data sources for the provider computing system 102. For example, payee 106 and/or downstream payee 109 may hold a first account at a first bank, which, in some embodiments, may be the payee data source 110. A payer may hold a second account at a second bank (not shown). In some embodiments, the first bank and the second bank are the same entity. In other embodiments, the first bank and the second bank are different entities.

The computing device(s) 104 of the payee 106, payer 108 and/or downstream payee 109 are connected to a network 111. Also connected to the network 111 is the provider computing system 102. In some embodiments, the provider computing system 102 is affiliated with, for example, a bank, a credit union, and the like, which may be the same as or different from the payee data source 110. In some embodiments, the provider computing system 102 is operated by a trusted intermediary, such as a platform and/or electronic service for connecting payees and payers, processing transactions (e.g., payments for purchased products and/or services, refunds, etc.), and/or facilitating secure transactions. In some embodiments, the provider computing system 102 is operated by a provider and/or operator of the payee data source 110. In some embodiments, the provider computing system 102 is operated by a cryptocurrency provider, intermediary, and/or payment processor.

Also connected to the network 111 is the payee data source 110. The contributors to the payee data source 110 may include payee(s) 106, payer(s) 108 and/or downstream payee 109. In an example embodiment, at least one payee 106 is connected to at least one payee data source 110 via the network 111 through the computing device 104. In some embodiments, the data from one or more data vault(s)

associated with the payee data source 110 is accessed and/or received by the provider computing system 102 to identify, predict, modify, and manage the business-to-individual payments from the payer 108 to the payee 106, as described further herein.

According to various embodiments, the payee data source 110 can be any electronic entity capable of gathering and/or providing data relevant to making a determination of a preferred payment method of the payee 106 and/or the downstream payee 109. For example, in some embodiments, the payee data source 110 can be a smart digital wallet, a social network, an internet-of-things (IOT) device, such as a smart appliance, a financial account, a digital currently account (comprising an account address or other identifier associated with the digital currency account, a public key of the electronic currency account holder, etc.), a transaction (for example, a financial transaction) and/or transaction history, a digital shopping list, digital location information (e.g., coordinates indicating a location of the computing device 104, of a smart appliance, etc.), and/or data associated with downstream payee 109 (e.g., name, address, service description, amount owed, a data set comprising recurring payments previously made by the payee 106 to the downstream payee 109 and/or contract-related information, etc.) One or more payee data source(s) 110 can be associated with the payee 106 and/or the downstream payee 109.

According to various embodiments, the business affiliate computing system 112 can be any electronic entity capable of gathering and/or providing data relevant to making a determination of a preferred payment method. The business affiliate computing system 112 can be a financial system, an electronic system that provides an account address or other identifier associated with an electronic currency account, a certificate authority for managing and verifying cryptographically protected transactions, a data repository comprising identifying information for further downstream payees, etc.

In the business-to-individual payment system 100, electronic communication between the provider computing system 102, one or more computing device(s) 104 used by one or more payee(s) 106, one or more payer(s) 108 and/or one or more downstream payee(s) 109, payee data source 110, and business affiliate computing system 112 is facilitated by the network 111. The network 111 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some embodiments or combinations, the network 111 includes a local area network or a wide area network. In some embodiments, the network 111 includes the internet. The network 111 is facilitated by short- and/or long-range communication technologies, such as Bluetooth® transceivers, Bluetooth® beacons, RFID transceivers, NFC transceivers, Wi-Fi transceivers, cellular transceivers, wired network connections (e.g., Ethernet), etc.

Each of the computing device(s) 104 and the provider computing system 102 have respective network interface circuits, such as those depicted in FIG. 1 at 114 and 116, respectively. The network interface circuits 114 and 116 may include the components described herein and/or additional similar components that allow and/or facilitate connectivity to the network 111. In some embodiments, data that passes through the respective network interface circuits 114 and 116 is cryptographically protected (e.g., encrypted) such that each of the network interface circuits 114 and 116 is a secure communication module. In some embodiments, data passing through the respective network interface circuits 114 and 116 is tokenized such that sensitive data (for example, account number(s), user location, personally identifying information, and the like) is obscured for transmission within or outside the business-to-individual payment system 100.

The computing device(s) 104 communicate over the network 111 with the provider computing system 102, the payee data source 110 and/or the business affiliate computing system 112. The computing device(s) 104, according to various embodiments, may comprise smartphones, laptop computers, tablet computers, e-readers, wearable devices (such as a smart watch, a smart bracelet, and the like), and other suitable devices. In reference to components described herein, references to the components in singular or in plural form are not intended as disclaimers of alternative embodiments unless otherwise indicated. In some embodiments, the components are configured to interact as described in further detail below. For example, the computing devices 104 can be mobile computing systems configured to run applications and communicate with other computer systems over the network 111. For example, the computing devices 104 may be configured to allow payee(s) 106, payer(s) 108 and/or downstream payee(s) 109 to view account balances, manage accounts, provide loans, and/or transfer funds from a given account by using, for example, a mobile banking circuit (e.g., a circuit formed at least in part by an application associated with and/or connected to the provider computing system 102 and installed on, or otherwise provided to (for example, using the software-as-a-service delivery model), the computing devices 104). The mobile banking circuit of the computing devices 104 may comprise, be part of, and/or be configured to interact with (for example, through an application programming interface (API)) with one or more circuits of the provider computing system 102, which are described further herein.

With respect to the provider computing system 102, payee data source 110, and business affiliate computing system 112, various configurations are contemplated herein. In one example embodiment, all of the provider computing system 102, payee data source 110, and business affiliate computing system 112 are operated by the same entity. In another example embodiment, the provider computing system 102 and the payee data source 110 are operated by a first entity and the business affiliate computing system 112 is operated by a second entity different from the first entity. In yet another example embodiment, the provider computing system 102 is operated by a first entity, and the payee data source 110 and the business affiliate computing system 112 are operated by a second entity different from the first entity. In yet another example embodiment, each of the provider computing system 102, the payee data source 110, and the business affiliate computing system 112 is operated by a separate entity, all three entities being different from each other. As used herein, the term "operated" refers to a computing system being hosted, run, maintained, configured and/or managed to support business operations.

The provider computing system 102 facilitates business-to-individual payments. This is accomplished, in an exemplary embodiment, by predicting and making payments via preferred payment methods, including determining an amount of funds that a payer owes a payee, predicting a preferred funds transfer method of the payee, providing a notification to a payee device associated with the payee, receiving a user input from the payee device indicating an agreement with the preferred funds transfer method, and initiating, in response to the user input, a funds transfer from a source account of the payer to the payee. Predicting a preferred funds transfer method of the payee can include performing data analytics on at least one data source associated with the payee, such as a smart digital wallet, a social network account, a smart appliance, a financial account, a financial transaction, a shopping list, and a geographic location, etc. In some embodiments, predicting a preferred funds transfer method of the payee includes identifying candidates for downstream payees and/or providing a user interface for rerouting the payment in whole or in part to a downstream payee.

According to various embodiments, the provider computing system 102 may include at least one electronic circuit and at least one data storage entity. One or more electronic circuit(s) of the provider computing system 102 may be implemented as software code suitable for compilation, object code, executable file(s) and/or code, a set of machine language instructions, and/or in another suitable form for carrying out the computer-implemented method(s) described herein. In some embodiments, the one or more electronic circuit(s) may be implemented in a distributed fashion such that at least some of the code is executed and/or compiled on the computing device(s) 104. One or more data storage entities of the provider computing system 102 may be implemented as an electronic structure(s) suitable for storing information, including, for example, one or more persistent electronic structures, such as one or more database(s), electronic file(s), data mart(s), distributed ledger(s) and the like. The data stored in the one or more data storage entities of the provider computing system 102 may be stored in a multidimensional form such that the structure of the data storage entity has two dimensions (e.g., a look-up table having indexed data) or more (e.g., a relational database, a multi-dimensional database, an online analytical processing (OLAP) cube, etc.). To improve database aggregation time and/or dimensional scalability, the data stored in multidimensional form may be aggregated and/or stored using suitable storage methods such that summary data is calculated prior to being stored (e.g., a block storage method, etc.) or is dynamically calculated after being stored when the data is retrieved for analysis and/or transaction processing (e.g., an aggregate storage method, etc.).

In an example embodiment of FIG. 1, the provider computing system 102 includes electronic circuits and data storage entities. Electronic circuits of the provider computing system 102 include a network interface circuit 116, a user experience circuit 122, a transaction management circuit 124, a payment method recommender engine 126, and a token generator 134. The data storage entities of the provider computing system 102 include a data vault 130 and a token vault 132. These circuits and/or data storage entities may be combined as needed such that one or more data storage entities and/or circuit(s) are implemented in a hybrid form. An example of a hybrid implementation is a data storage entity having a shell and/or providing an API such that a library of code (for example, executable functions containing Data Manipulation Language (DML) instructions) may be used by entities within or outside the business-to-individual payment system 100.

As described herein, the network interface circuit 116 is structured to enable all or some components of the provider computing system 102 to connect to other systems within or outside the business-to-individual payment system 100.

The user experience circuit 122 is structured to provide payee(s) 106, payer(s) 108, and/or downstream payee(s) 109, through the computing device(s) 104, with notifications/alerts and to allow the parties to approve payment method recommendations, edit payment methods and/or recommendations, designate downstream payee(s), edit payment properties, etc.

In some embodiments, the user experience circuit 122 is structured to provide alerts to any of the payee(s) 106, payer(s) 108, and/or downstream payee(s) 109, through the computing device(s) 104, to allow these parties to receive and respond to notifications related to business-to-individual payments. The alerts/notifications may include a payment method recommendation generated by the payment method recommender engine 126. The user experience circuit 122 may be configured to generate, manage, update, and/or respond to an electronic user interface for interacting with the individual(s) through computing device(s) 104. In some embodiments, such as the embodiment of FIGS. 4 and 5, the electronic user interface is a graphical user interface (GUI) visually presented to the payee(s) 106, payer(s) 108, and/or downstream payee(s) 109 through the computing device(s) 104. In other embodiments, the electronic user interface may comprise aural, auditory, tactile, kinesthetic, and/or haptic system(s) and/or component(s) for notifying and interacting with payee(s) 106, payer(s) 108, and/or downstream payee(s) 109. For example, the computing device(s) 104 may buzz, vibrate, trigger an LED light indicator, and/or otherwise alert the payee(s) 106, payer(s) 108, and/or downstream payee(s) 109 to the alert(s) and/or notification(s) received through the user experience circuit 122.

In some embodiments, the user experience circuit 122 allows the payee(s) 106, payer(s) 108, and/or downstream payee(s) 109 to approve payment method recommendations, edit payment methods and/or recommendations, designate downstream payee(s), edit payment properties, etc. In some embodiments, the user experience circuit 122 is configured to generate and provide an alert that includes a payment method recommendation generated by the payment method recommender engine 126. In some embodiments, the user experience circuit is structured to provide alternatives to the payment method recommendation, such as, for example, a list of payment methods available to the payee 106 or the downstream payee 109 which can be used to complete a transaction. The list may comprise interactive controls, such as links, buttons, graphics, etc. that are configured to navigate to an application (e.g., open a window, present a pop-up form, restructure a master user interface to embed the pop-up form such that it is part of the master interface, etc.). The application can be associated with a payment method selected by the user from the list. The list may be a ranked list. In some embodiments, the user experience circuit 122 is configured to allow a party to designate a downstream payee and/or edit payment properties, such as the recipient, the amount, the date, the expiration date for payee funds pickup, a preferred funds pickup location or a geographical range therefor, etc. In some embodiments, responsive to receiving a designation of the downstream payee 109 by the payee 106, the user experience circuit 122 is configured to present one or more user interfaces to a computing device 104 of the downstream payee 109 to allow the downstream payee 109 to approve payment method recommendations generated specifically for the downstream payee 109, edit payment methods and/or recommendations, designate further downstream payee(s), edit payment properties, etc.

The transaction management circuit 124 is structured to initiate an electronic funds transfer from a first account associated with the payer 108 (such as the payer funds account 128, which can be a financial account, a cryptocurrency account, etc.) to a second account associated with the payee 106 or the downstream payee 109 designated by the payee 106. The funds can be transferred in a funds transfer transaction 140. In some embodiments, the transaction management circuit 124 is configured to transfer the funds and/or schedule the funds transfer transaction 140 immediately upon receiving confirmation/approval from the payee 106. In some embodiments, there may be another triggering event before the funds transfer transaction 140 is initiated, such as, for example, reaching a scheduled date of the funds transfer transaction 140, approval of the funds transfer transaction 140 by the downstream payee 109, etc. According to various embodiments, the transaction management circuit 124 may transfer the funds using a suitable payment network and/or protocol, such as automated clearing house (ACH), PayPal™ Google Pay™, BitPay™, Wirex™, digital voucher/token, etc.

In some embodiments, the payment method recommender engine 126 is structured to determine the amount of funds owed by the original payee to the downstream payee, analyze data provided by/retrieved from one or more payee data source 110, predict a preferred payment method of the payee 106, build and/or amend a token that includes encoded information associated with a payment transaction using the predicted preferred payment method, etc. In some embodiments, the payment method recommender engine 126 includes a data vault 130, which is used for storing and staging data associated with the funds transfer transaction 140 from the payer funds account 128, executed based on the predicted preferred payment method. In some embodiments, the payment method recommender engine 126 includes a token vault 132 and a token generator 134, which, respectively, store and generate/amend digital vouchers and/or tokens created in the process of predicting a payment method or managing the funds transfer transaction 140 from the payer funds account 128.

Figure 2:
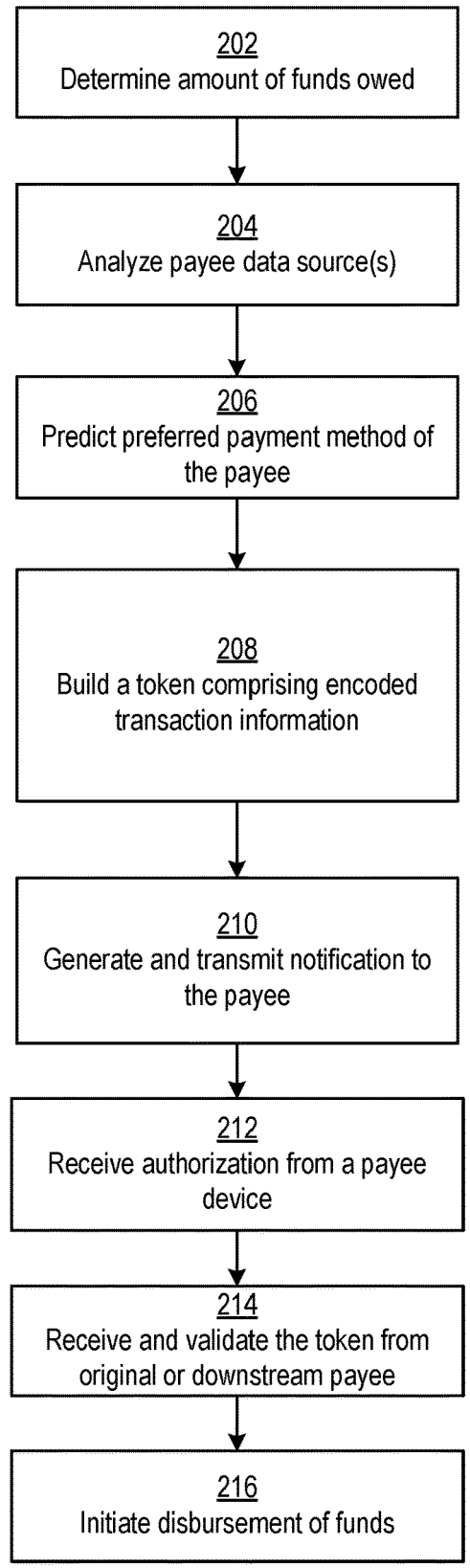
FIG. 2 is a flow diagram of a method of predicting and making payments via preferred payment methods, according to an example embodiment.

Referring now to FIG. 2, a flow diagram of a method 200 of predicting and making payments via preferred payment methods is shown, according to an example embodiment. In some embodiments, method 200 is performed by the provider computing system 102 and/or the computing device 104 such that some or all of the functionality of the electronic circuits of the provider computing system 102 is performed on and/or by the computing device(s) 104 of the payee 106, payer 108, and/or downstream payee 109. In some embodiments, the method 200 is performed by the user experience circuit 122, transaction management circuit 124, and/or the payment method recommender engine 126 of the provider computing system 102. While performing the method 200, the provider computing system 102, for example, communicates data over the network interface circuit 116 of the provider computing system 102, and the computing device(s) 104 communicate data over the network interface circuit 114 of the computing device(s) 104. The method 200 includes programmatic steps for determining the amount of funds owed to the payee 106 and/or the downstream payee 109, analyzing one or more data sources associated with the payee 106 and/or the downstream payee 109 to identify data items relevant to determining the preferred payment method thereof, predicting a preferred payment method of the payee 106 and/or the downstream payee 109, building a token comprising encoded transaction information, generating and transmitting a notification/alert to the payee 106 and/or the downstream payee 109 regarding an upcoming payment to be received using the predicted preferred payment method, receiving authorization from the computing device 104 of the payee 106 and/or the downstream payee 109, receiving and validating the token from the payee 106 (original payee) and/or the downstream payee 109, and initiating the payment transaction. According to various implementations, some of these steps may be combined or omitted. For example, building the token and/or validating the token may be omitted where the payment transaction is not a cash transaction that requires a verifiable electronic voucher.

As defined herein, the term "original payee" refers to the payee 106. A payment may be owed by the payer 108 to the payee 106 such that a business or contractual relationship exists between these two parties.

As defined herein, the term "downstream payee" refers to a downstream payee 109 of the payee 106. A payment may be owed by the payee 106 to the downstream payee 109 such that a business or contractual relationship exists between these two parties. The term "downstream payee", where context so indicates, may refer to further downstream payees of the downstream payee 109, in which case a payment may be owed by the downstream payee 109 to the subsequent downstream payee, such that a business or contractual relationship exists between these two parties.

At 202, the payment method recommender engine 126 is structured to determine the amount of funds owed by the original payee to the downstream payee. For example, the payment method recommender engine 126 can be structured to determine the amount of funds owed by the payer 108 to the payee 106. In some embodiments, to determine that a payment is due, the payment method recommender engine 126 is structured to analyze data items from one or more data sources associated with the payer 108, such as account information, an enterprise resource planning (ERP) system, an accounts payable (AP) system, etc. In some embodiments, the user experience circuit 122 is structured to provide a graphical user interface to the payer 108 via the computing device 104 and to solicit/accept data inputs from the payer 108. The data inputs can be structured to gather information regarding a payee 106 of the payer 108. For example, the payer 108 may register a payee 106 with the business-to-individual payment system 100 such that a new payer/payee relationship record is established in the data vault 130 of the provider computing system 102. The payer/payee relationship record may include data regarding the contract between payer and payee (e.g., description of services, payment terms, installment payment amount, payoff period duration, interest rate, frequency of payments, etc.) The payment method recommender engine 126 is structured to retrieve and analyze data items in the payer/payee relationship record from the data vault 130 in order to determine the amount owed by the payer 108 to the payee 106. In some embodiments, the payment method recommender engine 126 is structured to use an electronic parameter to retrieve the required information. The electronic parameter can include an identifier of the payer 108, an identifier of the payee 106, etc. In some embodiments, the payer/payee relationship record is associated with a blockchain-based digital contract (e.g., smart contract, self-executing contract, etc.) that has elements of the payment method recommender engine 126 built it. For example, the smart contract can comprise at least one electronic item and/or code functionality structured to trigger a determination of the amount owed by the payer 108 to the payee 106 (or a group of payees that includes the payee 106, such as caterers, suppliers, contractors, etc.) This determination can be made within a certain number of days from the due date of the payment owed by the payer 108 to the payee 106 (e.g., 7 days, 1 day, etc.)

At 204, the payment method recommender engine 126 is structured to analyze data provided by/retrieved from one or more payee data source 110. According to various embodiments, the payee data source 110 can be any electronic entity capable of gathering and/or providing data relevant to making a determination of a preferred payment method of the payee 106 and/or the downstream payee 109.

According to various embodiments, the payment method recommender engine 126 may receive and exchange data with the payee data source 110 through any of a standardized electronic data interchange (EDI) protocol, an API, a query and/or an extract, transform, and load (ETL) process, etc. The data can be received in any suitable format, such as an EDI transaction, a data file (e.g., text file, CVS, Excel, etc.), a relational dataset/table, etc. The data can be queried by the payment method recommender engine 126 on a periodic basis (e.g., once a day, once an hour, every 30 min., etc.) or pushed from the payee data source 110 in real-time as the data is updated. In some embodiments, the payment method recommender engine 126 is configured to query the payee data source 110 within a predetermined time of the due date of the payment owed the payee 106, such as 1 week, 1 day, etc.

The data received from the payee data source 110 can be stored in volatile memory (e.g., RAM, etc.), non-volatile memory (e.g., data vault 130, etc.) or both of the provider computing system 102. In some embodiments, the payment method recommender engine 126 is configured to stage and/or clean the data received from the payee data source 110 (for example, using an ETL process, etc.) For example, the payment method recommender engine 126 may comprise a validator circuit configured to compare a timestamp associated with a source data item from the payee data source 110 to the current date and time to determine that the data is usable. The timestamp may include the date/time the source data was created in the payee data source 110, generated for download by the provider computing system 102, received by the provider computing system 102, etc. According to various embodiments, staging and/or cleaning the data may comprise checking that a data value is within a predetermined range or set of values, checking that a data value is consistent with prior values received for the payee 106 (for example, that a social network identifier, account number, etc. are consistent with those provided by the payee 106 during registration with the payment method recommender engine 126, etc.)

If the payee data source 110 requires login credentials of the payee 106 and/or downstream payee 109, the payment method recommender engine 126 can be structured to provide, through a user interface of the computing device 104, a pop-up window on the computing device 104 of the payee 106 requesting login credentials to access the smart digital wallet of the payee 106. In some embodiments, the login credentials are provided by the payee 106 only once, for example, when the payee 106 is registered with the business-to-individual payment system 100 such that a new payer/payee relationship record is established in the data vault 130 of the provider computing system 102. In some embodiments, the login credentials for the payee data source 110 are linked to and/or replaced with an account of the payee 106, such as a social network account, an email service/cloud storage account, a cellular telephone services provider account, etc. In some embodiments, where the payee data source 110 is a blockchain-based system, the login credentials comprise a public key of the payee 106 and/or an address identifying a particular data asset on the blockchain-based system. In some embodiments, the address is a hash of the public key of the payee 106. In some embodiments, the public key is provided by a certificate authority, such as the business affiliate computing system 112.

At 206, the payment method recommender engine 126 is structured to predict the preferred payment method of the payee 106. In some embodiments, this prediction is carried out based at least in part on analyzing data items received from the payee data source 110.

In some embodiments, the payee data source 110 is a financial account, a digital currency account (comprising account address or other identifier associated with the electronic currency account, public key of the electronic currency account holder, etc.), a transaction (for example, a financial transaction) and/or transaction history. In some embodiments, the payee data source 110 is a smart digital wallet. The smart digital wallet of the payee 106 can be linked to one or more accounts of the payee 106, such as a bank account (checking, savings, money market, IRA, etc.), a brokerage trading account, a credit card, a home equity line, etc. Predicting the preferred payment method of the payee 106 may comprise evaluating a history of transactions involving the payee data source 110 to identify upcoming cash outflows in relation to the predicted balance, determining an account most frequently used by the payee 106 (for example, relative to a predefined period of time, such as the past month, year to date, etc.), determining the amount of the funds transfer transaction 140 and identifying the account most frequently used by the payee 106 for transactions in the dollar range for the amount (e.g., under $50, under $100, under $500, under $1,000, etc.), and/or analyzing current offerings of the financial institution associated with the account to identify the best investment opportunities (e.g., an interest rate offered for a savings account, a bonus offered for opening a new account, etc.)

In some embodiments, the payee data source 110 is a social network. Predicting the preferred payment method of the payee 106 may comprise browsing the social network of the payee 106 to identify the interests of the payee 106. For example, if the payee 106 is interested in an upcoming concert, taking a trip, etc., predicting the preferred payment method of the payee 106 can include providing rewards, discounts, and the like at the relevant partner retailers. In some embodiments, the payee data source 110 is a digital shopping list, which may be associated with the social network. For example, the payee 106 may create a gift registry, a wish list, a "saved for later" list, etc. In such embodiments, predicting the preferred payment method of the payee 106 may comprise identifying a registry item, determining the monetary value of the registry item, and offering to send a registry item to the user in place of the funds transfer transaction 140 and/or providing rewards, discounts, and the like at the relevant partner retailers.

In some embodiments, the digital shopping list of the payee 106 may comprise a list of items that the payee 106 needs to purchase. The digital shopping list may be associated with the social network of the payee 106 as described above or may be generated by an internet-of-things (IOT) device, such as a smart appliance of the payee 106. In some embodiments, when the payee 106 registers with the payment method recommender engine 126, the payee 106 can specify access information (such as the IP address, account name, password, etc.) for one or more smart appliances. Additionally or alternatively, the payee 106 may configure the smart appliance to push notifications directly to the payment method recommender engine 126. Predicting the preferred payment method of the payee 106 using the digital shopping list of the payee 106 can comprise identifying an item to be purchased from the list, browsing the internet and/or querying one or more predetermined retailer data sources (e.g., searching website(s), etc.) to determine a current price of the item, determining the best price for the item, offering to send the item to the user in place of the funds transfer transaction 140, and/or providing rewards, discounts, and the like at the relevant partner retailers.

In some embodiments, the payee data source 110 provides digital location information (e.g., geographic coordinates indicating a location of the computing device 104, of a smart appliance, etc.). In some embodiments, predicting a preferred payment method of the payee 106 can comprise analyzing the digital location information to determine the preferred payment method. For example, if the geographic coordinates indicating a location of the computing device 104 show that the payee 106 is currently overseas, the payment method recommender engine 126 can be structured to obtain a list of financial institutions near (e.g., within 1 mile, 5 miles, etc.) the geographic location, determine which of these financial institutions holds an account for the payee 106, identify a single such financial institution closest to the payee 106, and recommend the associated account as the preferred payment method. In some embodiments, if a natural disaster occurred near the payee 106, predicting the payment method includes determining that the payee 106 will likely want to be paid in cash and issuing a redeemable digital voucher as described in FIG. 3.

In some embodiments, the payee data source 110 provides data associated with a downstream payee 109 of the payee 106. The data can include a predefined list of downstream payees, including name, address, description of work performed or financial relationship between payee 106 and downstream payee 109, amount owed by payee 106 to downstream payee 109, a data set comprising recurring payments previously made by the payee 106 to the downstream payee 109, contract-related information, etc. Predicting a preferred payment method can comprise identifying downstream payees 109 of the payee 106 to whom payment is due in the near term (e.g., past due, due within 1 day, 1 week, 1 month, etc.), determining the best candidate from among multiple downstream payees 109 (e.g., based on when the payment is due, whether the payment amount is within the same range as the amount owed to the payee 106 by the payer 108 (e.g., within 10%, 20%, etc.)), and offering, through the user interface of the computing device 104 of the payee 106, to make a payment to the candidate/downstream payee 109 on behalf of the payee 106.

According to various embodiments, any of the above processes, operations, and/or payee data sources 110 can be combined in a particular embodiment as needed. For example, data from more than one payee data source 110 can be used to predict the preferred payment method. Additionally or alternatively, to determine the preferred payment method, the payment method recommender engine 126 can be structured to consider a category to which the payee 106 belongs (e.g., age group, income level, etc.), the type of work performed to earn the payment, location, etc. When the predicted payment method is cash, such additional characteristics can be used to determine how the payment will be delivered to the payee 106 (e.g., via courier, a distribution point near the location, via a voucher comprising a token if the payee 106 has a smart digital wallet, by instead identifying downstream payees, etc.)

At 208, the payment method recommender engine 126 is structured to build a token that includes encoded information associated with a payment transaction using the predicted preferred payment method. For example, if the predicted preferred payment method is cash and it is determined that the computing device 104 of the payee 106 is a mobile device, the payee 106 may be paid via a voucher, which can be digitally transferred to another individual, configured to expire on a predetermined date, etc. The voucher can include the token. The token can be alphanumeric or pictorial, such as a QR code configurable to be keyed in or scanned using a camera of a mobile device, a scanner at a distribution point for monetizing the token, etc. The token comprises information, such as the amount, payment method (exchange for cash), location range for authentication/monetization of the voucher, expiration timestamp, etc.) According to various embodiments, the token can be fully or partially anonymized. For example, the token can include de-identified (e.g., scrambled, encoded, replaced with a randomly generated value, etc.) information identifying some or all of the payer 108, the payee 106, the downstream payee 109, etc. The de-identified identifying information may comprise a user identifier, an issuing system identifier, account number, user name, public key of the individual, etc. In some embodiments, no such identifying information is included, similar to cash. In some embodiments, the token is immutable. In other embodiments, the token can be amended to reflect the chain of custody. For example, the recipient (the payee 106 or the downstream payee 109) may transfer the token to another party, such as another downstream payee and the token can be updated to include encoded identifying information about the new recipient.

In some embodiments, a certificate authority (e.g., the business affiliate computing system 112) can generate a first public/private key pair for the token generator 134 of the provider computing system 102 and a second public/private key pair for the payee 106. The certificate authority can associate the first public/private key pair with the token generator 134, and can sign each token using the first private key from the first public/private key pair to ensure origin authenticity of the token. The first private key can be distributed to the token generator 134 and submitted by the token generator 134 to the certificate authority as part of a request to sign a token. The certificate authority can associate the second public/private key pair with the computing device 104 of the payee 106, and can sign each amended token using the second private key from the second public/private key pair to enable proof-of-custody of the token. The second private key can be distributed to the computing device 104 of the payee 106 and submitted by the computing device 104 of the payee 106 to the certificate authority as part of a request to sign a token.

Figure 4:
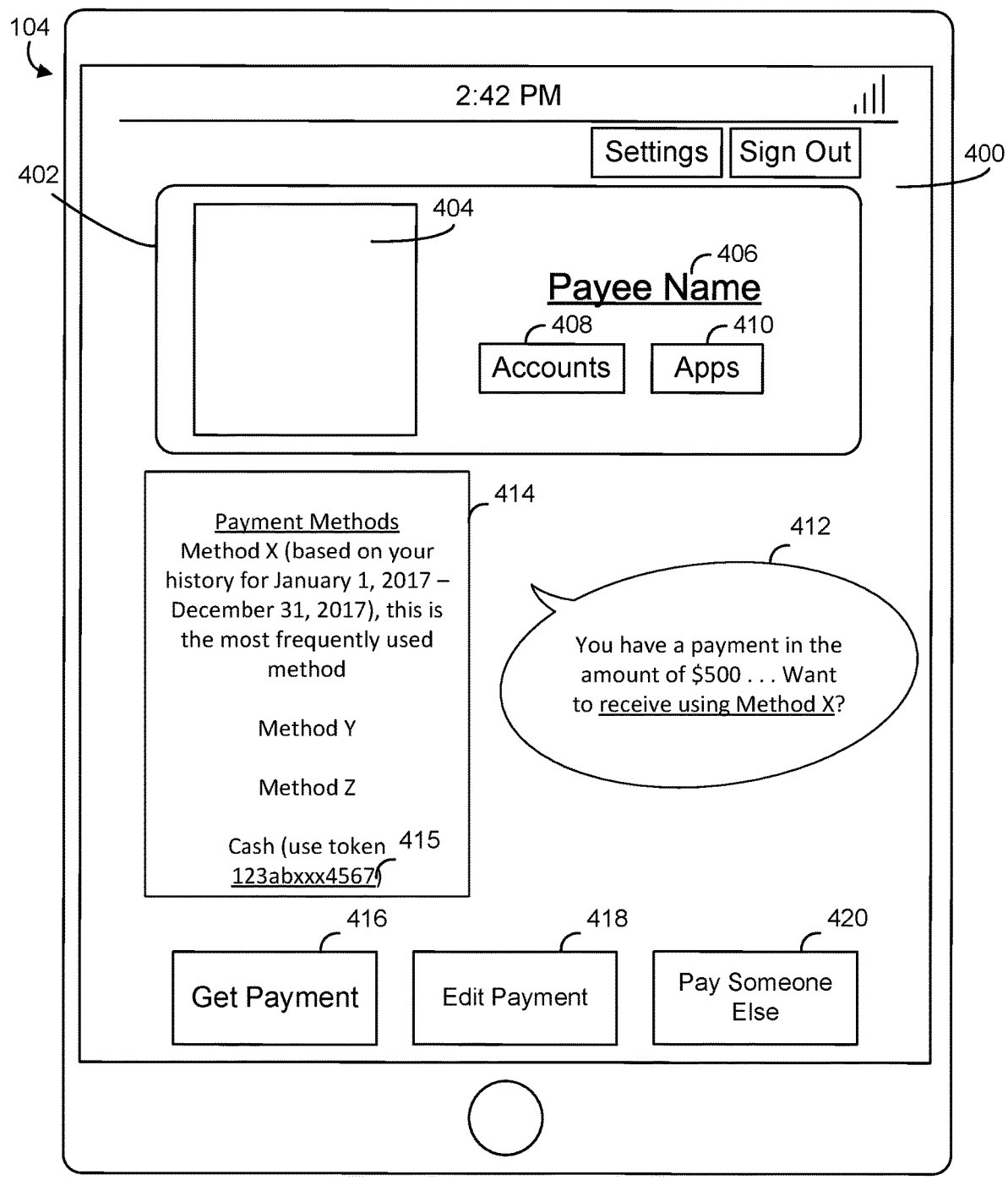
FIG. 4 is an interface on a display of a computing device, the interface including graphics for predicting and making payments via preferred payment methods, according to an example embodiment.

At 210, the user experience circuit 122 is structured to build and send a notification to the computing device 104 of the payee 106, such as the alert 412 of FIG. 4. In the example embodiment, the notification is an electronic record that includes data fields populated with values including personally identifying information for the payee 106 and the payer 108. The personally identifying information for the parties may include an account handle, user name, account number in combination with a reference to a specific system, email address, social media handle, name, telephone number, email address, residence and/or business address, etc. The notification further includes the payment amount and the predicted preferred payment method. In some embodiments, the notification further includes the token generated at 208, and the user interface may be configured to allow the recipient of the notification to pass the token along to another party via email, a text/SMS message, a message via a social network, etc.

In some embodiments, the notification is a "pull" notification. For example, the notification may be provided in response to the scheduling of a payment by payee 106 and/or payer 108. In such embodiments, the notification may take the form of a confirmation SMS/text message, confirmation email, etc. In some embodiments, such as that of FIG. 4, the notification is a "push" notification. For example, the notification may be structured to inform the payee 106 that a payment is due to be received on a certain future date.

The notification is provided as an electronic message. According to various embodiments, the electronic message may be provided as an email, text, a pop-up window on the computing device 104 of the payee 106, etc. The electronic message may contain a link to an executable file accessible by the computing device 104 to instruct the business-to-individual payment system 100 to generate and render an electronic form having an interface for accepting approved and/or edited payment method(s). For example, a "push" notification that informs payee 106 that a payment is due to be received soon may be structured to provide navigation control (e.g., a link, a button, etc.) for the payee 106 to access a user interface configured to display proposed payment methods.

At 212, the user experience circuit 122 is structured to receive authorization from the computing device 104 of the payee 106. According to various embodiments, the electronic message may contain a link, a button, etc. for the payee 106 to click on/select to indicate acceptance. In some embodiments, the payee 106 may set thresholds for automatic acceptance of the payment. The thresholds may comprise a maximum amount of the funds transfer transaction 140, a list of pre-approved predicted payment methods, how far out the payment is scheduled (e.g., automatically accept a payment scheduled to occur in less than 24 hours), etc.

At 214, the transaction management circuit 124 is structured to receive and validate the token if one was created at 208. For example, a token can be monetized at a predetermined distribution point, where it can be keyed into a computing system or scanned using a camera of a mobile device or a scanner using near-field communications (NFC). The transaction management circuit 124 can be structured to parse the token (e.g., identify various items, data fields, etc. within the token), extract a timestamp and/or original payee information from the parsed token, compare such information to the current date and time and/or a list of authorized users, ensure that the token was not previously monetized, etc. Once the token is validated, the voucher associated with the token can be monetized. For example, cash can be disbursed to the holder of the voucher.

At 216, the transaction management circuit 124 is structured to initiate disbursement of funds in a funds transfer transaction 140. According to various embodiments, the transaction management circuit 124 may transfer the funds using a suitable payment network and/or protocol, such as automated clearing house (ACH), PayPal™, Google Pay™, BitPay™ Wirex™, etc.

Figure 3:
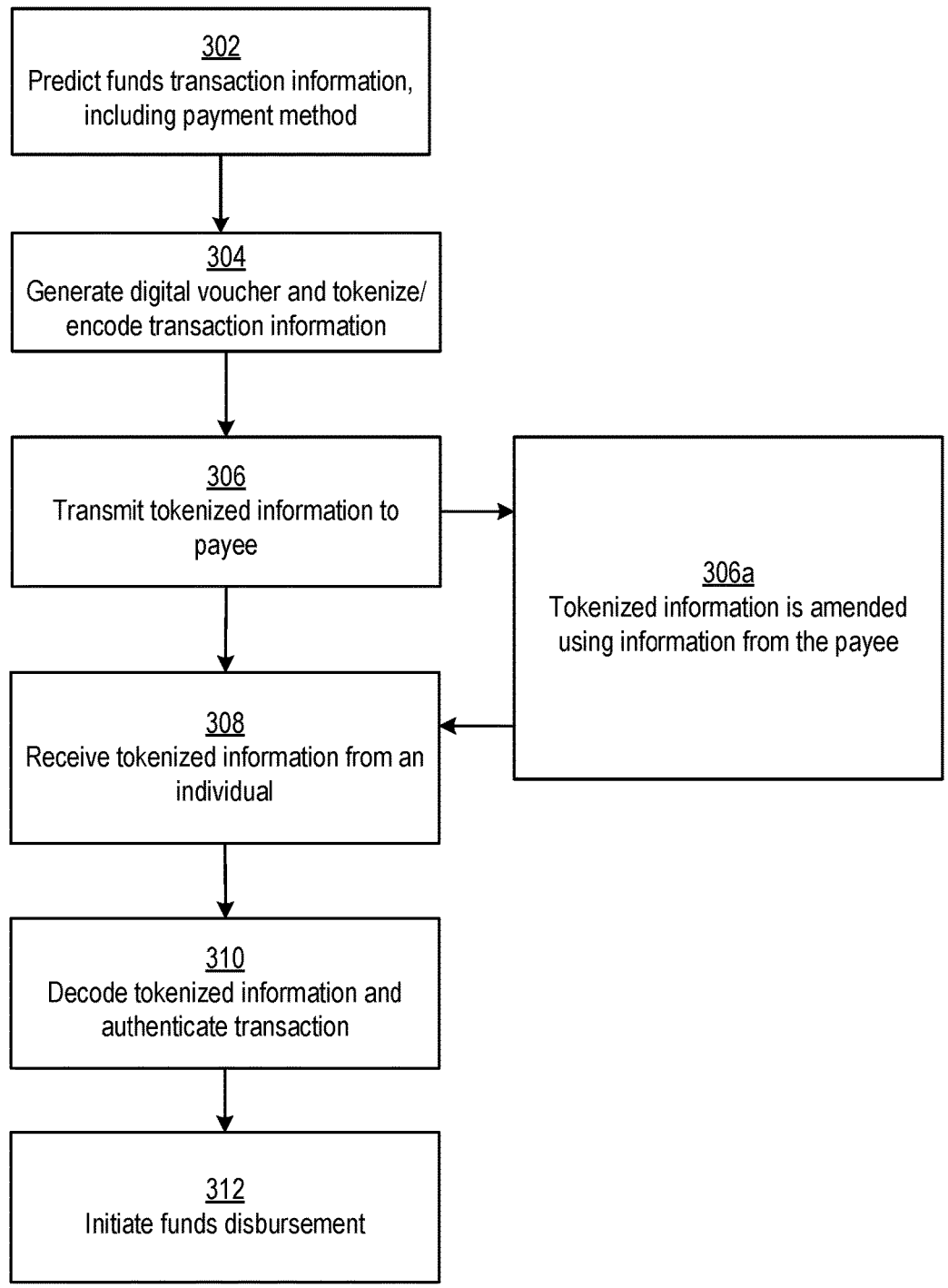
FIG. 3 is a flow diagram of a method of making payments to original and/or downstream payees via an electronic voucher, according to an example embodiment.

Referring now to FIG. 3, a flow diagram of a method 300 of making payments to original and/or downstream payees via an electronic voucher is shown, according to an example embodiment. In an example embodiment, an electronic voucher is issued to the payee 106 and/or downstream payee 109 when the predicted preferred payment method is cash.

In some embodiments, method 300 is performed by the provider computing system 102 and/or the computing device 104 such that some or all of the functionality of the electronic circuits of the provider computing system 102 is performed on and/or by the computing device(s) 104 of the payee 106, payer 108, and/or downstream payee 109. In some embodiments, method 300 is performed by the user experience circuit 122, transaction management circuit 124, the payment method recommender engine 126, and/or the token generator 134 of the provider computing system 102. While performing the method 300, the provider computing system 102, for example, communicates data over the network interface circuit 116 of the provider computing system 102, and the computing device(s) 104 communicate data over the network interface circuit 114 of the computing device(s) 104. The method 300 includes programmatic steps for predicting the payment method, generating a digital voucher, including tokenizing transaction information, transmitting the token to the payee 106 or downstream payee 109, amending the token, receiving tokenized information to monetize the voucher, authenticating the transaction, and initiating a funds disbursement.

At 302, payment method recommender engine 126 is structured to predict the preferred payment method for the payee 106 as described, for example, relative to process 206 of FIG. 2. Data from more than one payee data source 110 can be used to predict the preferred payment method. Additionally or alternatively, to determine the preferred payment method, the payment method recommender engine 126 can be structured to consider a category to which the payee 106 belongs (e.g., age group, income level, etc.), the type of work performed to earn the payment, location, etc. For example, if a natural disaster occurred near payee 106, payee 106 may prefer to be paid in cash. When the predicted payment method is cash, these additional characteristics can be used to determine how the payment will be delivered to the payee 106 (e.g., via courier, a distribution point near the location, via a voucher comprising a token, by instead identifying downstream payees, etc.)

Here, a "voucher" is defined as a document (e.g., an electronic document) redeemable for cash, and the "token", which includes relevant transaction information, is included in the voucher. Some or all information associated with the payment transaction may be included in the voucher alongside the token (e.g., non-sensitive information, such as payment amount, etc.) or included in the token itself (e.g., sensitive financial or validation/proof-of-custody information, such as issuer of the voucher, etc.).

The predicted payment method can include disbursement information (e.g., pay through a voucher). The payment method recommender engine 126 can determine that a voucher payment is recommended if the payee 106 has a smart digital wallet, if the computing device 104 of the payee 106 is a mobile device that includes a camera capable of reading a QR code, if the payee 106 has an associated designated preferred payment and disbursement method and the method is cash via a voucher, if the provider computing system 102 is unable to identify any financial account information associated with the payee 106, if a downstream payee 109 is identified and/or designated by the payee, etc.

At 304, the token generator 134 is configured to generate a voucher, generate the token as described, for example, in reference to FIG. 2, and include the token in the voucher. In some embodiments, the voucher is a digital document stored as a data item, a collection of data items, a record, an XML page, etc. In some embodiments, the voucher can be stored in non-volatile storage media of the provider computing system 102, such as the data vault 130 or the token vault 132. The digitally stored voucher can be cryptographically protected. For example, the digitally stored voucher can be encrypted using a public/private key pair associated with the provider computing system 102. In some embodiments, the voucher includes executable code in addition to data (e.g., the voucher can be implemented as an XML page that includes one or more JavaScript functions). For example, the voucher and/or token can be configured to auto-update proof-of-custody/validation information when certain events occur (e.g., when the voucher is saved, when the voucher is opened on an unrecognized computing device not associated with the payee 106, etc.)

At 306, the user experience circuit 122 is structured to transmit the voucher and/or the token to a computing device 104 of the payee 106. For example, the voucher can be rendered as a pop-up box, provided as a link in a text message, included as part of a notification/alert, etc. The voucher or parts thereof (such as the token) can be displayed to the payee 106 using a graphical user interface on the computing device 104 of the payee 106.

At 306a, the user experience circuit 122 is structured to amend the voucher and/or token in response to an action taken by the payee 106. For example, the payee 106 may want to transfer the voucher to another user, such as the downstream payee 109. In some embodiments, the user interface on the computing device 104 is structured to provide an input control for the payee 106 to specify a downstream payee 109, and the user experience circuit 122 is configured to amend the token to add downstream payee information, such as identifier, social network handle, name, email address, phone number, etc. As another example, the payee 106 may want to change the payment amount such that the voucher is redeemable in part by the payee 106 and in part by the downstream payee 109. In some embodiments, the user interface on the computing device 104 is structured to provide an input control for the payee 106 to specify a reduced amount to pay the downstream payee 109, and the user experience circuit 122 is configured to amend the token to add the new amount information. In some embodiments, the provider computing system is structured to generate a new voucher and a new token comprising the remaining amount, amend the new token to include an identifier of the parent token and/or voucher and transmit the new voucher, including the new token, to the computing device of the payee 106. The new token can be amended to set a new expiration timestamp. In some embodiments, the new expiration timestamp of the new token is set to be the same as the expiration timestamp of the parent token. In some embodiments, the new expiration timestamp reflects a new expiration date further out in the future. For example, if the parent token was valid for 30 days and the user took 2 days to transfer the parent token to the downstream payee 109, the new token including the remaining amount redeemable by the payee 106 may be set to expire 32 days from the date the parent token was issued.

At 308, the transaction management circuit 124 is structured to receive the voucher and/or token as part of monetizing the voucher. For example, the token/voucher can be monetized at a predetermined distribution point, where it can be keyed into a computing system or scanned using a camera of a mobile device or a scanner using near-field communications (NFC).

At 310, the transaction management circuit 124 is structured to parse the token (e.g., identify various items, data fields, etc. within the token), extract a timestamp and/or original payee information from the parsed token, compare such information to the current date and time and/or a list of authorized users, ensure that the token was not previously monetized, etc. In some embodiments, the token is a concatenated alphanumeric string that includes several random numbers, each random number randomly generated, padded with characters to have a predetermined length (e.g., 10 digits), and mapped to a particular item denoting information encoded the token (e.g., a user identifier, an issuing system identifier, account number, user name, etc.) Additionally, the token can comprise unscrambled information, such as transaction amount, expiration date/time, etc. A token validator circuit of the provider computing system 102 can be structured to identify each segment of a predetermined length in the token and determine (based, for example, on the character position of the segment, length of the segment, prefix of the segment, etc.) the corresponding particular information item encoded in the token. The information can be evaluated to validate the token by verifying the user identifier, issuing system identifier, account number, user name, etc.

Once the token is validated, the voucher associated with the token can be monetized. For example, cash can be disbursed, at 312, to the holder of the voucher.

Referring now to FIG. 4, an interface 400 is shown on a display of a computing device 104, the interface 400 including graphics for predicting and making payments via preferred payment methods, according to an example embodiment. In the example embodiment, the interface 400 is rendered to the payee 106 on a device of the payee 106 and/or to the downstream payee 109 on a device of the downstream payee 109. The interface 400 on the display of a computing device 104 includes account holder information 402 for the payee 106 and/or downstream payee 109, an avatar 404, a username 406, an accounts button 408, and an apps button 410. In some embodiments, the accounts button 408 provides access to one or more accounts of the payee 106, where the accounts are held with a provider and/or an intermediary. In some embodiments, the apps button 410 provides access to one or more applications installed on the computing device 104, which may interface (e.g., through an API) with the one or more accounts of the payee 106 and/or the payer 108.

In some embodiments, a "push" notification 412 is provided that informs the payee 106 that a payment is due to be received soon from an account associated with payer 108. The "push" notification 412 may be structured to provide a navigation control (e.g., a link, a button, etc.) for the payee 106 to access a user interface (such as that of FIG. 5) configured to display and allow the payee 106 to change or edit the predicted payment method. Examples of predicted payment methods include check, direct deposit, cash, wire, ACD, credit, a smart digital wallet transaction, a voucher, etc.

According to various embodiments, the "push" notification 412 may be delivered as a pop-up, an updated and newly rendered digital container/form containing other graphics controls for the interface 400, a text message, an email, and the like. The "push" notification 412 may be customized based on the type of the computing device 104.

In some embodiments, a graphic is generated to provide payee 106 with an interactive predicted payment method control 414. The interactive predicted payment method control 414 can be configured to include one or more navigable elements (e.g., links, buttons, graphics, etc.) that represent at least one predicted payment method. In some embodiments, the interactive predicted payment method control 414 includes more than one payment methods. The navigable elements representing more than one payment methods can be arranged in a sequence that is visually instructive of the rank of the payment methods. In some embodiments, the highest-ranked (most likely) payment method may be listed on top of a list and the remaining controls may be arranged, in a descending ranking order, below the highest-ranked payment method. In some embodiments, only the highest-ranked (most likely) payment method may be presented to the user, and the navigable elements associated with lower-ranked methods may be displayed on demand responsive to detecting user interaction with one or more elements of the interface 400.

In some embodiments, the interactive predicted payment method control 414 includes a digital voucher link 415 that provides a link to an electronic voucher and/or token that can be monetized (exchanged for cash), transferred to another party, etc. Upon detecting user interaction with the digital voucher link 415 or with a pay someone else control 420, the interface 400 is structured to present a pop-up window (such as the change payment control 502 of FIG. 5) that includes information about the corresponding digital voucher or token. According to various embodiments, the pop-up window may comprise some or all of the elements shown in FIG. 5. The pop-up window may comprise further controls allowing the user to transfer in whole or in part, amend, monetize, etc. When the voucher or token is transferred to another individual in whole or in part, the pop-up window can be structured to gather transferee information, such as a social network handle, phone number, electronic address associated with a smart digital wallet, etc. In some embodiments, the transferee information is pre-populated with predicted values determined by the payment method recommender engine 126, as described in relation to FIG. 2, based on analyzing social network connections, calendar, address book, etc. of the user/payee 106.

In some embodiments, interface 400 comprises a get payment control 416 and the edit payment control 418. Upon detecting user interaction with the get payment control 416, the interface 400 is structured to mark the proposed payment transaction (e.g., the funds transfer transaction 140 summarized in the "push" notification 412) as approved and proceed to authorize, schedule, and/or initiate a funds transfer transaction. Upon detecting user interaction with the edit payment control 416, the interface 400 is structured to display some or all elements shown in FIG. 5, such as the change payment control 512. The change payment control 512 can be a digital form overlaying the underlying elements of the interface 400. The digital form may be configured to be semi-transparent such that the underlying elements (e.g., the payment method control 414) are visible to the user. In some embodiments, the digital form is configured to be pre-populated at least in part based on detecting a mouse hover, touch, or similar user activity over one of the navigable elements/payment methods listed in the payment method control 414. For example, the payment type, designated pickup location, voucher expiration date, etc. can be pre-populated. In some embodiments, at least some of these elements are pre-populated based on detecting current location of the computing device 104, based on parsing the token to determine its expiration date if the user hovers over, touches or otherwise interacts with the digital voucher link 415, etc. The digital form can be updated/re-populated if the user moves on and hovers over, touches, or otherwise interacts with a different navigable element/payment method in the list.

Figure 5:
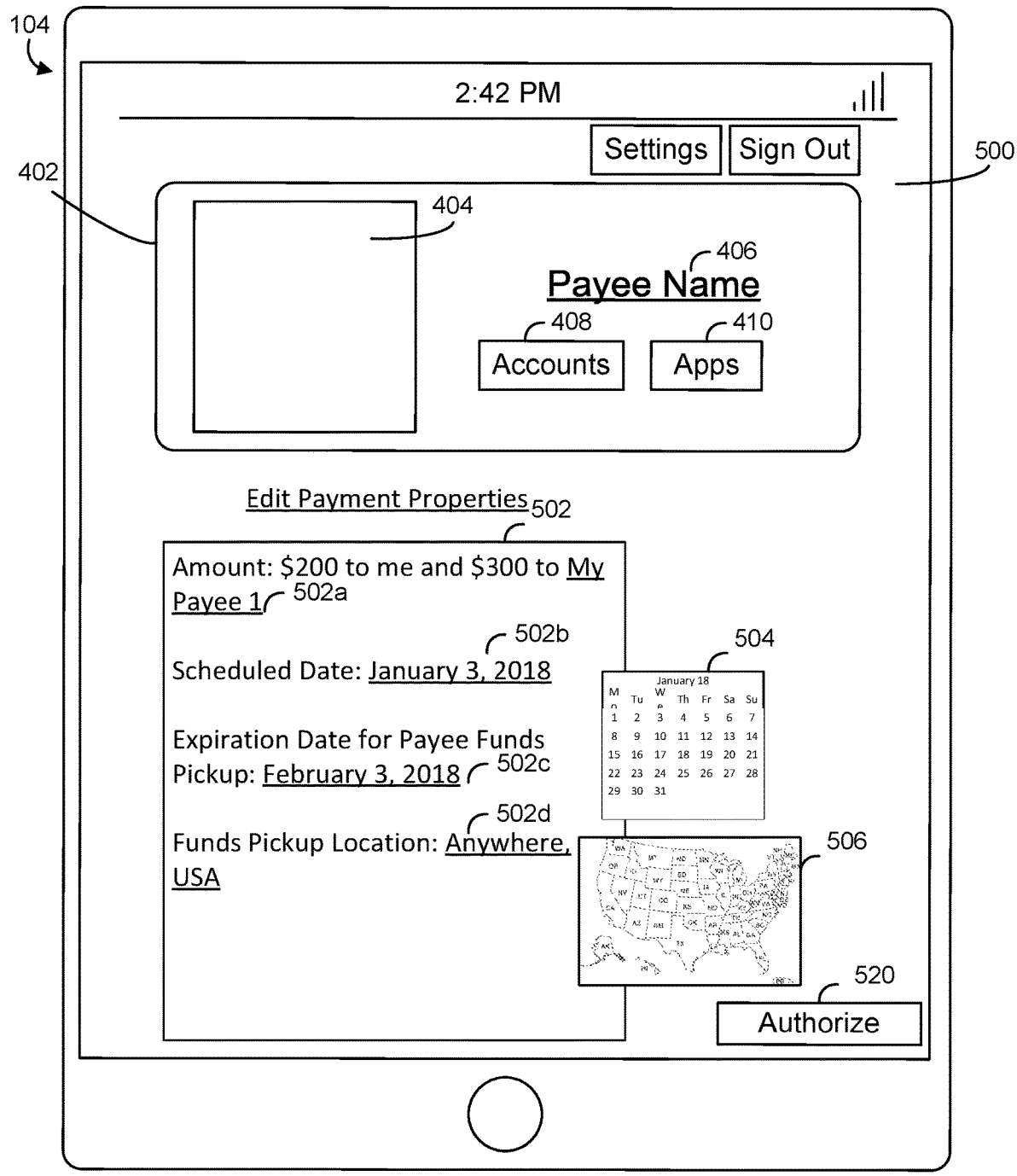
FIG. 5 is an interface on a display of a computing device, the interface including graphics for managing payments initiated in FIG. 4, including designating a downstream payee, according to an example embodiment.

Referring now to FIG. 5, an interface 500 is shown on a display of a computing device 104, the interface 500 including graphics for managing payments initiated in FIG. 4, including designating a downstream payee, according to an example embodiment. The interface 500 is provided to the payee 106 through the computing device 104. The interface 500 on a display of a computing device 104 includes account holder information 402 for the payee 106 and/or the payer 108, including an avatar 404, a username 406, an accounts button 408, and an apps button 410.

In some embodiments, the interface 500 is structured to display a change payment control 502 responsive to detecting user interaction with one or more controls, as described in FIG. 4. In some embodiments, the change payment control 502 includes information about a predicted payment method (or one of a plurality of predicted payment methods) selected by a user, such as the payee 106 or downstream payee 109. In the embodiment of FIG. 5, the change payment control 502 allows the payee 106 to split the payment amount into a first partial amount due the payee 106 and a second partial amount due a downstream payee 502a. According to various embodiments, the downstream payee 502a may be the downstream payee 109 determined as described in reference to FIG. 2. In some embodiments, the interface 500 is configured to check the partial payment amounts for integrity such that, for example, the sum of partial payment amounts equals the full payment amount from the alert 412 of FIG. 4.

In some embodiments, the change payment control 502 includes interactive input controls that allow that payee 106 to manage various aspects of a payment, such as the payment due the payee 106 (e.g., the payment amount from the alert 412 in full or in part) or the payment due to the downstream payee 502a. The interactive input controls can include the scheduled payment date 502b, voucher or token expiration date 502c, and/or a funds pickup location 502d.

Upon detecting user interaction with the control for the payment date 502b and/or the expiration date 502c, the change payment control 502 can be configured to display a pop-up assistant control, such as a calendar 504. In some embodiments, the range of available dates from the calendar 504 is restricted based on the current date, current expiration date of a voucher or token, payment due date, a date selected from a payee data source 110 (such as a calendar), etc. Upon detecting user interaction with the calendar 504, the change payment control 502 is configured to set the scheduled date 502b to a selected value.

Upon detecting user interaction with the control for the funds pickup location 502d, the change payment control 502 can be configured to display a pop-up assistant control, such as a map 506. In some embodiments, the range of available dates from the map 506 is restricted based on a value from the payee data source 110, such as a current location of the computing device 104 of the payee 106, a current location of the downstream payee 109, calendar information including a planned travel schedule, which is compared to the expiration date 502c, etc. Upon detecting user interaction with the map 506, the change payment control 502 is configured to set the funds pickup location 502d to a selected value. In some embodiments, the selected value includes one or more sets of coordinates supplemented by numerical value(s) for the allowable radius, such as 1 mile, 5 miles, etc. The allowable radius for the user-selected set of coordinates can be determined based on determining a set of coordinates for at least one monetization/distribution point closest to the user-selected set of coordinates, determining the distance between the distribution point and the user-selected set of coordinates, and setting the radius to be equal to at least the distance. In some embodiments, the selected value is one or more geographic regions, such as a zip code, municipality, county, state, country, continent, etc. The geographic region can be determined based on determining a current location of the user device for the payee 106 and/or downstream payee 109, analyzing a travel schedule, etc.

In some embodiments, the selected data for the scheduled payment date 502b, voucher or token expiration date 502c, and/or a funds pickup location 502d automatically saved if a new selection is detected. In some embodiments, such as when a token is used, the original and updated values are recorded as part of the amended token.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed:

1. A computer-implemented method performed by one or more processors of a computing system, the method comprising:
   determining an amount of funds that a payer owes a payee;
   predicting a preferred funds transfer method of the payee based on payee data received from a payee data source, wherein the payee data source is a third-party computing system configured to provide the payee data to the computing system;
   generating a token based on the predicted preferred funds transfer method, the token comprising encoded information that is decodable to identify the predicted preferred funds transfer method and the payee;
   providing a notification to a payee device associated with the payee, the notification comprising the token comprising the encoded information that is decodable to identify the predicted preferred funds transfer method and the payee;
   receiving a user input from the payee device indicating an agreement with the predicted preferred funds transfer method; and
   initiating, in response to the user input, an electronic funds transfer from a source account of the payer to the payee.

2. The method of claim 1, wherein the payee data includes at least one of: an age group of the payee, an income level of the payee, a type of job performed by the payee to earn the amount of funds owed to the payee, and a location of the payee.

3. The method of claim 1, further comprising:
   registering the payee with a payee data repository by at least associating the payee device with a payee record in the payee data repository;
   analyzing a payee data repository dataset to predict the preferred funds transfer method of the payee; and
   generating a prediction of characteristics associated with the predicted preferred funds transfer method of the payee, comprising determining, based on an evaluation of a subset of the payee data repository dataset, at least one method used by the payee to send or receive funds from an account associated with the payee.

4. The method of claim 3, wherein the payee data repository comprises a data set associated with at least one of: a smart digital wallet, a social network account, a smart appliance, a financial account, a financial transaction, a shopping list, and a geographic location.

5. The method of claim 3, further comprising:
   identifying a plurality of accounts associated with a smart digital wallet of the payee;
   analyzing a history of transactions within a predetermined time period for each of the plurality of accounts; and
   based on analyzing the history of transactions, identifying an account from the plurality of accounts as the predicted preferred funds transfer method of the payee.

6. The method of claim 3, further comprising:
   identifying an item on a digital shopping list of the payee, the item having a price within a range of the amount of funds that the payer owes the payee; and
   identifying the item as the predicted preferred funds transfer method of the payee.

7. The method of claim 3, further comprising identifying a geographical location of the payee based on receiving a set of coordinates from the payee device.

8. The method of claim 3, wherein the payee is a first payee, and wherein the payee data repository comprises a data set associated with a downstream payee of the first payee, the method further comprising:
   using a tokenized access credential for mining the payee data repository to determine the first payee's funds transfer history;
   identifying the downstream payee based on a history of the first payee's funds transfer activity between the first payee and the downstream payee; and
   substituting the downstream payee for the first payee to perform the electronic funds transfer.

9. The method of claim 1, wherein the third-party computing system is a social network of the payee, and wherein the payee data is historic social network data of the payee.

10. The method of claim 9, further comprising:
    identifying the social network of the payee; and
    receiving digital shopping list from the social network of the payee, wherein the digital shopping list is based on the historic social network data of the payee.

11. The method of claim 1, further comprising:
    generating a digital voucher including the token, wherein the digital voucher is associated with the predicted preferred funds transfer method of the payee and wherein the token comprises at least one of: a funds amount, an account number, a job identifier, and a funds pickup location; and
    transmitting the token and the digital voucher to a mobile device of the payee.

12. The method of claim 11, further comprising, responsive to detecting a user input value via the payee device, amending the token to include the user input value, wherein the user input value is indicative of at least one of a designation of a downstream payee, an updated amount, an updated transaction date, and an updated funds pickup location.

13. The method of claim 11, further comprising:
    receiving an additional digital token generated by a computing device of the payee;
    comparing corresponding information in the additional digital token to the encoded information in the token associated with the digital voucher to authenticate a funds transfer transaction; and
    initiating, in response to authenticating the funds transfer transaction, a disbursement of the funds amount associated with the token to the payee.

14. A computing system comprising one or more processors configured to:

determine an amount of funds that a payer owes a payee;
predict a preferred funds transfer method of the payee based on payee data received from a payee data source, wherein the payee data source is a third-party computing system configured to provide the payee data to the computing system;
generate a token based on the predicted preferred funds transfer method, the token comprising encoded information that is decodable to identify the predicted preferred funds transfer method and the payee;
provide a notification to a payee device associated with the payee, the notification comprising the token comprising the encoded information that is decodable to identify the predicted preferred funds transfer method and the payee;
receive a user input from the payee device identifying a downstream payee, wherein the payee and the downstream payee are different payees;
generate an amended token comprising encoded information that is decodable to identify the downstream payee; and
initiate, based on the encoded information in the amended token, an electronic funds transfer from a source account of the payer to the downstream payee.

15. The system of claim 14, wherein the payee data includes at least one of: an age group of the payee, an income level of the payee, a type of job performed by the payee to earn the amount of funds owed to the payee, and a location of the payee.

16. The system of claim 14, wherein the one or more processors are configured to:
analyze a payee data repository dataset to predict the preferred funds transfer method of the payee; and
generate a prediction of characteristics associated with the predicted preferred funds transfer method of the payee, comprising determining, based on an evaluation of a subset of the payee data repository dataset, at least one method used by the payee to send or receive funds from an account associated with the payee.

17. The system of claim 16, wherein the payee data repository dataset is associated with at least one of: a smart digital wallet, a social network account, a smart appliance, a financial account, a financial transaction, a shopping list, and a geographic location.

18. The system of claim 16, wherein the one or more processors are configured to:
identify a plurality of accounts associated with a smart digital wallet of the payee;
analyze a history of transactions within a predetermined time period for each of the plurality of accounts; and
based on analyzing the history of transactions, identify an account from the plurality of accounts as the predicted preferred funds transfer method of the payee.

19. The system of claim 14, wherein the one or more processors are configured to:
generate a digital voucher including the token, wherein the digital voucher is associated with the predicted preferred funds transfer method of the payee and wherein the token comprises at least one of: a funds amount, an account number, a job identifier, and a funds pickup location; and
transmit the token and the digital voucher to a mobile device of the payee.

20. The system of claim 19, wherein the one or more processors are configured to, responsive to detecting a user input value via the payee device, amend the token to include the user input value, and wherein the user input value is indicative of at least one of a designation of a downstream payee, an updated amount, an updated transaction date, and an updated funds pickup location.

21. The system of claim 19, wherein the one or more processors are configured to:
receive an additional digital token generated by a computing device of the payee;
compare corresponding information in the additional digital token to the encoded information in the token associated with the digital voucher to authenticate a funds transfer transaction; and
initiate, in response to authenticating the funds transfer transaction, a disbursement of the funds amount associated with the token to the payee.

22. A non-transitory computer readable medium containing instructions for causing at least one processor of a computing system to perform operations, the operations comprising:
determining an amount of funds that a payer owes a payee;
predicting a preferred funds transfer method of the payee based on payee data received from a payee data source, wherein the payee data source is a third-party computing system configured to provide the payee data to the computing system;
generating a token based on the predicted preferred funds transfer method, the token comprising encoded information that is decodable to identify the predicted preferred funds transfer method and the payee;
providing a notification to a payee device associated with the payee, the notification comprising the token comprising the encoded information that is decodable to identify the predicted preferred funds transfer method and the payee;
receiving a user input from the payee device indicating an agreement with the predicted preferred funds transfer method; and
initiating, in response to the user input, an electronic funds transfer from a source account of the payer to the payee.

23. The non-transitory computer readable medium of claim 22, wherein the payee data includes at least one of: an age group of the payee, an income level of the payee, a type of job performed by the payee to earn the amount of funds owed to the payee, and a location of the payee.

24. The non-transitory computer readable medium of claim 22, wherein the operations comprise:
registering the payee with a payee data repository by at least associating the payee device with a payee record in the payee data repository;
analyzing a payee data repository dataset to predict the preferred funds transfer method of the payee; and
generating a prediction of characteristics associated with the predicted preferred funds transfer method of the payee, the generating comprising determining, based on an evaluation of a subset of the payee data repository dataset, at least one method used by the payee to send or receive funds from an account associated with the payee.

25. The non-transitory computer readable medium of claim 24, wherein the third-party computing system is a social network of the payee, and wherein the payee data is historic social network data of the payee, and wherein the operations comprise:

identifying the social network of the payee; and receiving a digital shopping list from the social network of the payee, wherein the digital shopping list is based on the historic social network data of the payee.

26. The non-transitory computer readable medium of claim 24, wherein the operations comprise:

identifying a plurality of accounts associated with a smart digital wallet of the payee;

analyzing a history of transactions within a predetermined time period for each of the plurality of accounts; and based on analyzing the history of transactions, identifying an account from the plurality of accounts as the predicted preferred funds transfer method of the payee.

27. The non-transitory computer readable medium of claim 24, wherein the payee is a first payee, and wherein the payee data repository comprises a data set associated with a downstream payee of the first payee, wherein the operations comprise:

using a tokenized access credential, mining the payee data repository to determine the first payee's funds transfer history;

identifying the downstream payee based on a history of the first payee's funds transfer activity between the first payee and the downstream payee; and substituting the downstream payee for the first payee to perform the electronic funds transfer.

28. The non-transitory computer readable medium of claim 24, wherein the operations comprise:

generating a digital voucher including the token, wherein the digital voucher is associated with the predicted preferred funds transfer method of the payee and wherein the token comprises at least one of: a funds amount, an account number, a job identifier, and a funds pickup location; and transmitting the token and the digital voucher to a mobile device of the payee.

29. The non-transitory computer readable medium of claim 28, wherein the operations comprise:

responsive to detecting a user input value via the payee device, amending the token to include the user input value, wherein the user input value is indicative of at least one of a designation of a downstream payee, an updated amount, an updated transaction date, and an updated funds pickup location;

receiving an additional digital token generated by a computing device of the payee;

comparing corresponding information in the additional digital token to the encoded information in the token associated with the digital voucher to authenticate a funds transfer transaction; and initiating, in response to authenticating the funds transfer transaction, a disbursement of the funds amount associated with the token to the payee.

* * * * *